350-6.3        SR
      XR    3,634,696

Tx 3022 T

[11] 3,634,696

| | | | |
|---|---|---|---|
| 1,699 | 5/1963 | Hammar | 250/236 |
| 9,126 | 2/1968 | Adams | 250/219 |
| 8,065 | 4/1970 | Holford | 250/236 |
| ,0,759 | 12/1964 | Ward | 250/219 X DF |
| 3,553,437 | 1/1971 | Boothroyd | 250/219 X DC |

*Primary Examiner*—Walter Stolwein

[45] Patented  Jan. 11, 1972

[54] RADIATION-SENSITIVE OPTICAL SCANNING APPARATUS
  16 Claims, 15 Drawing Figs.
[52] U.S. Cl.................................................. 250/219 D,
              250/236, 250/217, 350/6
[51] Int. Cl................................................. G08c 9/06
[50] Field of Search.................................... 200/219,
         236; 350/6; 250/219 DD, 217; 356/203, 160

[56]         References Cited
           UNITED STATES PATENTS
1,763,482  6/1930  Scheppman................. 250/219

ABSTRACT: A line of light produced by an incandescent lamp is set coincident with the axis of a rotor that contains a plurality of lenses. These successively form a light image of said line of light on a record. Upon rotation of the rotor the brightly illuminated image sweeps the lines of characters of the record. The lighted character portions are projected back towards the rotor axis through lenses of said rotor to a common point occupied by a photocell. The characters of the record are made up of parallel bars approximately perpendicular to the line of characters. The light image is aligned with said bars.

7 6 5 4 3 2 1

3634696
OR IN 250/567

INVENTOR:
Ernest Wildhaber 3,634,696

INVENTOR:
Ernest Wildhaber

RADIATION-SENSITIVE OPTICAL SCANNING APPARATUS

The present invention relates to optical scanning of a record, for electric transmission for instance to a computer, to tape or to a distant point.

Objects of the invention are to simplify the apparatus, to reduce cost, to provide a high output speed, and especially to make optical scanning very reliable at low cost. Other objects will appear in the course of the specification and in the recital of the appended claims.

The apparatus requires characters made up of bars, preferably according to a binary system. Such characters are already in existence. A further and preferred form is described in detail in my companion application entitled "Record for Machine Scanning" filed on even date herewith, Ser. No. 17,791.

Figure 4:

FIG. 4 spells out the word EUREKA with such characters.

Figure 5:
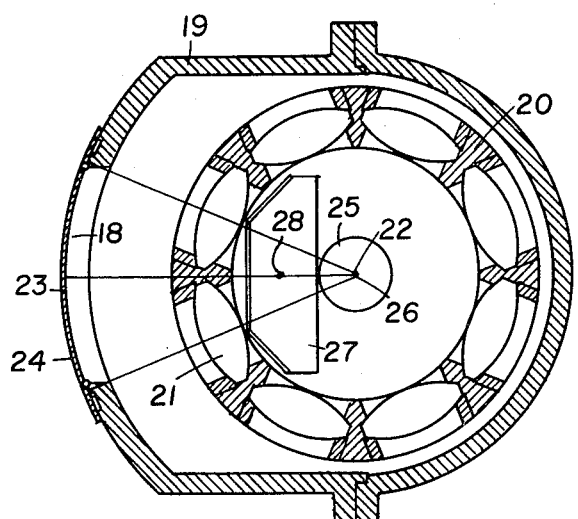

FIG. 5 is a cross section of an apparatus constructed according to the invention. It is taken through the rotor and its housing along a plane containing the lens centers.

Figure 6:
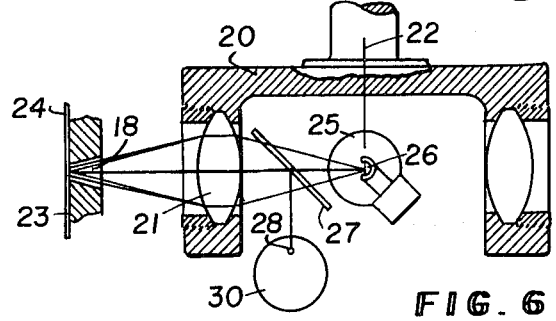

FIG. 6 is an axial section corresponding to FIG. 5 and taken through lens centers.

Figure 7:
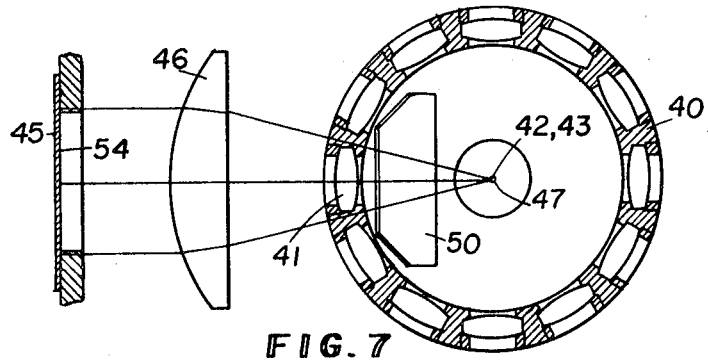
Figure 9:
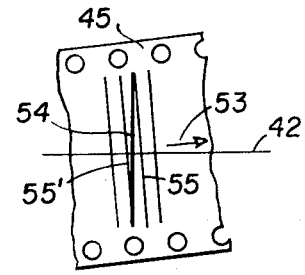
Figure 8:
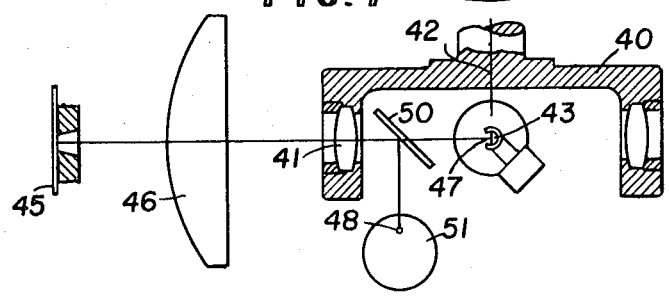

FIGS. 7 to 9 show a modification.

FIG. 7 is a cross section of the rotor taken through the lens centers, showing also means for attaining a straight scanning line.

FIG. 8 is an axial section corresponding to FIG. 7.

FIG. 9 is a fragmentary view of the record showing its inclined feed.

Figure 10:
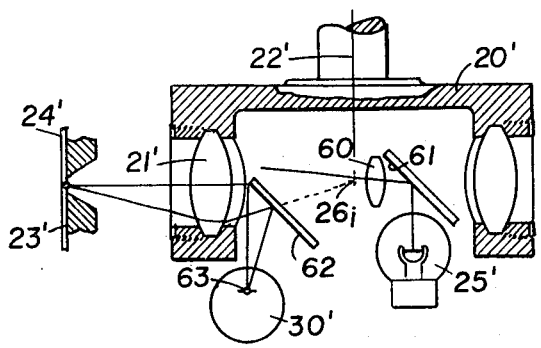
Figure 11:
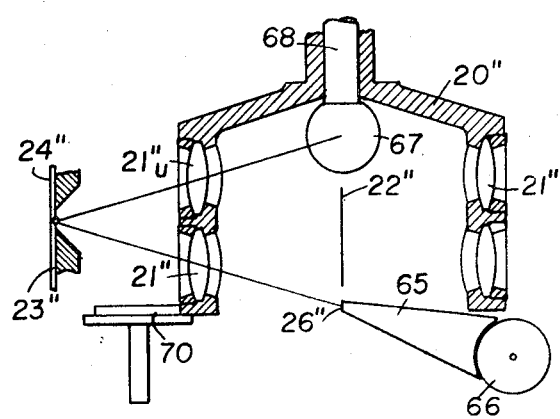

FIGS. 10 and 11 are axial sections showing further modifications.

Figure 1:
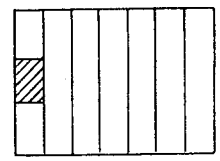
FIG. 1 is an enlarged view of a character space of this form.
Figure 12:
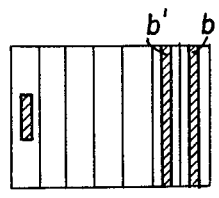
Figure 13:
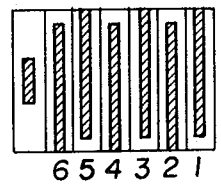
Figure 14:
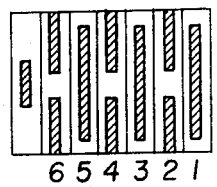

FIGS. 12, 13 and 14 are views of a character space, similar to FIG. 1, illustrating various modifications of the marks or bars thereon.

Figure 15:

FIG. 15 spells out the word EUREKA with bars according to FIG. 13.

Figure 2:
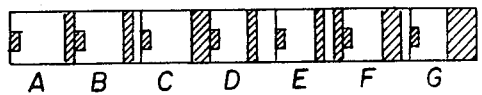
FIG. 2 shows one way of making up the letters A to G in a binary code.
Figure 3:
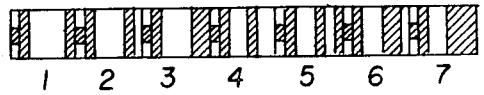
FIG. 3 shows numerals made up in this manner.

The character space shown in FIG. 1 and those shown in FIGS. 12, 13, 14 are subdivided into a plurality of narrow upright compartments numbered 1, 2, 3, 4, 5, 6, 7 in FIG. 1. They have equal width. The bar at 7 is a timing mark of reduced length, signalling the start of a character. FIGS. 2 to 4 show characters in which the bars completely fill their allotted compartments.

FIG. 12 shows two bars $b$, $b'$ inscribed into the character space. Here and in FIGS. 13 and 14 the bars have a width smaller than their compartments.

FIGS. 13 and 14 show bars inscribed into all positions provided. In FIG. 13 the bars have all equal length, but alternate bars are shifted heightwise with respect to the other bars. Thus the bars at 1, 3, 5 are in a high position, while the bars at 2, 4, 6 are in a low position. This gives an added distinction to the bar position, which facilitates personal reading. The bars of FIG. 14 have a different overall height. The longer bars 2, 4, 6 are split in the middle, but have the same accumulated bar length as the bars at 1, 3, 5.

I may use from four to nine bar spaces in a character.

At the present time bars of the type shown in FIGS. 12 to 14 are favored over full-width bars.

Turning now to the apparatus, rotor 20 carries a plurality of equal lenses 21 arranged in a circle about its axis 22. The record 24 hugs a cylindrical outside surface 23 of housing 19. Surface 23 is coaxial with the rotor. The filament of an incandescent lamp 25 is arranged to produce a linelike area of light 26, called a line of light hereafter. This straight line of light is set coincident with the axis 22 of the rotor. The lenses 21, or lens assemblies, are dimensioned to form an image of the line of light 26 on the record 24, in approximate alignment with the marks or bars of the record. A narrow circular scanning slot 18 of the housing admits light to the scanning line that lies in a plane perpendicular to the rotor axis 22.

As the rotor turns on its axis the image of the line of light, the linelike strongly lighted area, moves along the scanning line from one end to the other, sweeping the characters thereon. The record is fed at a slight angle to the direction of the rotor axis 22, in proportion to the turning motion of the rotor. The feed direction is as indicated in FIG. 9 for the embodiment of FIGS. 7 and 8, where the record 45 is fed in direction 53 at an angle to the rotor axis 42. Direction 53 is such that opposite ends of the scanning line 54 reach opposite ends of adjacent lines 55, 55' of characters.

In FIG. 5 the rotor 20 is shown in a turning position of changeover from one character line to the next one. One of the lenses 21 has completely scanned a line, and the other of the two lenses 21 within reach of the scanning line is about to start on the next line very shortly.

Within the rotor 20 a half-silvered stationary plane mirror 27 is set in the radial path of light at an angle thereto. Half of its surface is reflective and the other half is transparent. The two halves are closely intertwined. The silvered surface may for instance run along closely spaced parallel lines. Mirror 27 reflects half the light from line 26 upwardly, without use. And it lets half the light through to the lenses 21 and to the record. The light reflected from the record returns through the same lens 21 through which light from the light source is passing. If it were not for mirror 27 all of the reflected light would form an image of the brightly lighted character portion at 26, on the axis of the rotor. The mirror 27 let only half the reflected light through to the rotor axis, without further use. The other half of this light is reflected downwardly, so that the image of the lighted character portion appears at fixed point 28. This image is symmetrical to the one formed at 26, the mirror surface being the plane of symmetry. A photocell 30 is placed adjacent point 28. It converts the light variations into fluctuations of electric current, for transmission.

In view of the light concentration on the record, the light should be switched on only after the rotor attains speed. This may be done automatically.

When the character bars fill their allotted space fully, as described with FIGS. 1 to 4, the light image on the record should be quite narrow, a small fraction of the width of said space. Bars according to FIGS. 12 to 14 permit wider light-images. The width should preferably be smaller than the width of the space between the bars. The increased width is helpful in making the filaments, which can be wound in larger helices.

EMBODIMENT WITH STRAIGHT SCANNING LINE, FIGS. 7 to 9

Rotor 40 contains a plurality of lenses 41 uniformly spaced in a circle about the rotor axis 42. A line of light 43 is placed coincident with the rotor axis 42. Light passes from line 43 through a stationary plane half-silvered mirror 50 and through a lens 41 to a large stationary lens 46 and to the scanning line 54. A record 45 is fed past scanning line 54, as described with FIG. 9. Lens 46 has its focus at 47 on axis 42, so that radial rays from point 47 become parallel rays after passing through lens 46. The lenses 41, or lens assemblies, are dimensioned to form an image of point 47 on the record 45 together with the described lens 46. If desired a composite lens 46 may be used.

Light reflected from the strongly lighted narrow character portion returns through lenses 46, 41 towards axis 42. Half of the returning light is reflected at the half-silvered mirror 50 to form an image of the lighted character portion at point 48 instead of at point 47. Points 47 and 48 are symmetrically positioned with respect to the plane mirror surface. They have the same distance therefrom and lie on the same line perpendicular to the mirror surface. Like point 47 point 48 is also stationary. A photocell 51 is placed adjacent to it, to convert the varying light intensity into varying electric current.

FURTHER EMBODIMENTS

The embodiments of FIGS. 10 and 11 use a circular scanning line. The records 24', 24'' hug cylindrical surfaces 23', 23'' that are coaxial with the respective rotors 20', 20''.

In the embodiment of FIG. 10 a reduced-size image $26_i$ of the linelike area of light emitted by source 25' is formed on the rotor axis 22' by a lens 60 and a mirror 61. This is a real image, but with another setup it could also be a virtual image. In all cases light appears to come from a line-portion coincident with the rotor axis. From $26_i$ light passes through the upper half of a lines 21' to record 24'. The sharply illuminated narrow character strip is projected back through the same lens 21' towards the rotor axis 22'. The light that returns through the lower lens portion is reflected at stationary plane and opaque mirror 62 to form an image at stationary point 63, instead of at $26_i$. A photocell 30' is placed adjacent point 63, to transmit the light variations as electric impulses.

Rotor 20" of FIG. 11 contains two sets of lenses 21". A line of light 26" coincident with the rotor axis 22" is obtained by means of a tapered light pipe 65 from a source 66. Any bright source of light can here be used. The so-called line of light results from gradually thinning down the light pipe towards the output end to a very narrow area and a height corresponding to the height of the characters. From 26" light passes through the lower lens 21" which forms an image of the light line 26" on the record. Light emitted from the narrow lighted area of the record passes through the upper lens ($21''_u$) that projects it to a photocell 67, forming an image of said area thereon.

The photocell is secured to a pin 68 that may be maintained stationary, while the rotor 20" turns around it. To neutralize the considerable overhang of rotor 20" a set of rollers 70 may bear against the outer end of rotor 20" to stabilize it. The several rollers 70, for instance three, rotate on fixed axes.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

I claim:

1. Apparatus for scanning characters arranged in a line and made up of parallel marks, comprising a rotor, a plurality of lenses carried by said rotor and arranged in a circle about the rotor axis, a source of light placed to emit a single, straight line of light appearing to come from the rotor axis, said lenses being positioned to at least take part in forming an image of said line of light on the record bearing said characters, to achieve a linelike strongly lighted area thereon in approximate alignment with said marks, whereby said lighted area is moved along said line of characters upon rotation of said rotor, means for projecting said lighted area through lenses of said rotor towards the rotor axis to a point common to all area positions, and a photocell placed adjacent said point for actuation by the projected lighted area.

2. Apparatus according to claim 1 wherein said projecting means are the same lenses that form the linelike lighted area, and a stationary plane mirror placed within said lens circle to direct light returning from the record to said photocell.

3. Apparatus according to claim 1, wherein the record hugs a portion of a cylindrical surface coaxial with said rotor and is moved continuously past a circular arc scanning line centered on the rotor axis.

4. Apparatus according to claim 1, wherein a stationary lens is placed between the record and the rotor, and the record is moved past a straight scanning line that lies in a plane perpendicular to the rotor axis.

5. Apparatus according to claim 4, wherein the stationary lens has its focus on the rotor axis.

6. Apparatus according to claim 1, wherein the source of light is an incandescent lamp with a filament shaped to emit light from a linelike area extending along a single straight line.

7. Apparatus according to claim 6, wherein said linelike area of light lies on and follows approximately the rotor axis.

8. Apparatus according to claim 1, wherein said source of light is stationary.

9. Apparatus according to claim 1, wherein said source of light is a stationary incandescent lamp whose filament is wound to emit light from a single straight and narrow linelike area, stationary lens means are provided to form a reduced-size image of said area for further projection to the record.

10. Apparatus for scanning characters arranged in a line on a record, comprising
a surface for positioning a record,
a lens,
means for effecting turning motion between said surface and said lens about an axis at a distance from said surface and lens,
a source of light placed to emit light from a narrow area extending along a single straight line passing through said axis,
said lens being positioned to form a linelike lighted area on the record which is an image of said narrow area, so that said image is moved along said line of characters through said turning motion, said image extending crosswise of the line of characters,
lens means for projecting light reflected from said light image back towards said axis,
and means placed to receive said projected light and for converting fluctuations of the projected light image into electrical impulses.

11. Apparatus according to claim 10, wherein
said projecting means includes the same lens that forms the linelike lighted area on the record, and
a plane mirror disposed closer to said axis than said lens and placed in the path of said projection to direct light to said light-receiving means.

12. Apparatus according to claim 11, wherein said mirror is a half-silvered mirror set in the path of light coming from the light source and returning from the record, and the silvered portion is positioned to reflect part of the returning light to said light-receiving means.

13. Apparatus for scanning characters arranged in a line and made up of parallel marks, comprising
means for supporting a record bearing the characters,
a rotor,
at least one lens carried by said rotor at a distance from the axis of said rotor,
a source of light placed closer to the rotor axis than said lens and emitting light from a narrow area extending along a single straight line,
said lens being positioned to take part in forming an image of said area on said record, to achieve a strongly lighted area thereon by concentrating and confining the light thereto, whereby said lighted area is moved along said line of characters upon rotation of said rotor,
means for projecting said lighted area through a lens carried by said rotor towards the rotor axis to a point common to all positions of said lighted area along said line, and
a photocell placed adjacent said point to receive the light coming to said point.

14. Apparatus according to claim 13, wherein said rotor carries a plurality of lenses at a constant distance from its axis.

15. Apparatus for scanning characters arranged in lines on a record, comprising
a rotor containing at least one lens,
means for supporting a record,
means for effecting feed motion between said record and said rotor in a direction at an angle oblique to said character lines,
means for projecting a straight linelike area of light through said lens to the record while confining the light received by said record thereto, whereby said projected linelike area moves along a line of the record upon rotation of the rotor,
said linelike image extending crosswise of said line of characters, means at least partly on the rotor for forming an image of said projected lighted area adjacent a point common to all positions of said lighted area along said line and disposed closer to said axis than said lens, and means for converting light fluctuations at said image into electrical impulses, the means for forming an image of the projected lighted area including said one lens.

16. In apparatus for scanning characters arranged in a line record, a surface for positioning a record,
a lens,
a source of light for projecting light through said lens, means for effecting turning motion between said surface and said lens about an axis at a distance from said surface and lens and at an oblique angle to the direction of the line of characters, whereby the projected light moves along said line of characters, a photosensitive detector, and means for projecting the lighted record area line after line onto said detector, said lines extending crosswise of said line of characters, at least part of the last-named projecting means being said lens.

* * * * *